United States Patent Office

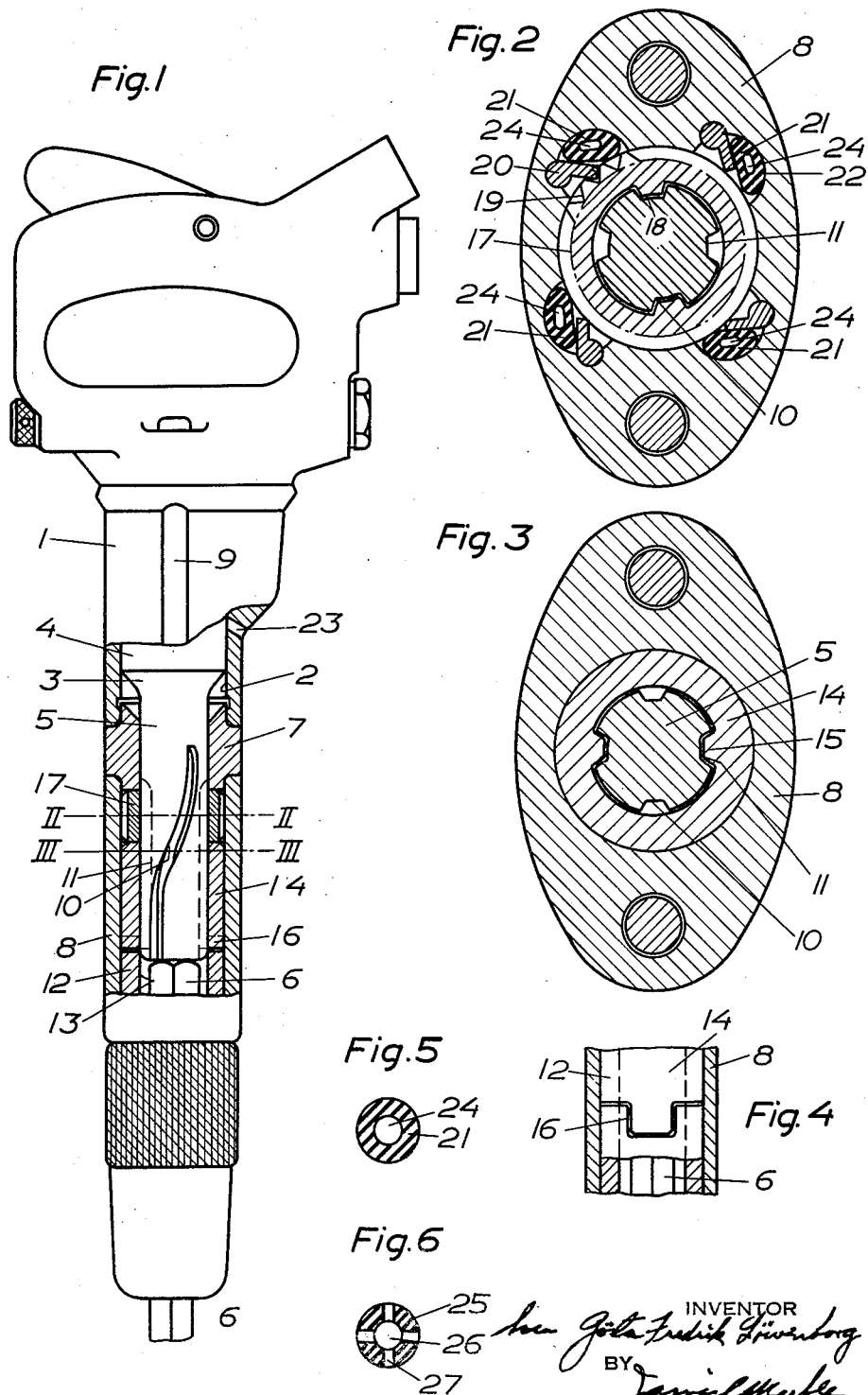

3,029,672
Patented Apr. 17, 1962

3,029,672
PAWL AND RATCHET MECHANISMS, PARTICULARLY FOR PNEUMATIC PERCUSSION TOOLS
John Gösta Fredrik Löwenborg, Stockholm, Sweden, assignor to Atlas Copco Aktiebolag, Nacka, Sweden, a corporation of Sweden
Filed Dec. 30, 1958, Ser. No. 783,736
3 Claims. (Cl. 81—52.3)

This invention relates to a pawl and ratchet mechanism, and particularly to a pawl and ratchet mechanism in a pneumatic percussion tool arranged for transforming the reciprocating movement of a hammer piston into a rotary movement of a working implement such as a rock drill steel or the like. In devices of this type breakage often occurs in the small helical steel springs which are normally provided for bringing the pawls into engagement with the ratchet teeth of the mechanism. One object of this invention is to provide a pawl and ratchet mechanism which is simple in construction and cheap in manufacture. A further object of the invention is to provide a pawl and ratchet mechanism in which steel springs, which are liable to break, are avoided. A still further object of the invention is to provide a pawl and ratchet mechanism which needs little space radially.

In the accompanying drawing a rock drill provided with a pawl and ratchet mechanism according to the invention is illustrated by way of example. FIG. 1 is a side view and partial longitudinal section of the rock drill and FIG. 2 is a section on line II—II of FIG. 1. FIG. 3 is a section on line III—III of FIG. 1. FIG. 4 shows a detail of FIG. 1. FIG. 5 is a cross section of a hollow biasing member illustrated in FIG. 2, and FIG. 6 shows a ball type modification of such member.

The rock drill illustrated in the drawing consists of a cylinder casing 1 forming a working cylinder 2 for a reciprocable hammer piston 3 having a piston head 4 operating in said working cylinder 2 and having a shank 5 adapted to deliver blows to a rock drill steel 6 inserted in the front end of the drill. The cylinder casing 1 is clamped together with an intermediate casing 7 and a chuck casing 8 by means of suitable side bolts 9. The piston shank 5 is in conventional manner provided with longitudinal inclined grooves 10 and longitudinal straight grooves 11. A chuck bushing 12 is rotatable in the chuck housing 8 and said chuck bushing has a non-circular opening 13 in which the shank of the drill steel 6 has a non-rotational fit. The opening in the bushing may, for instance, be hexagonal to fit a hexagonal drill steel shank or it may be provided with grooves to fit a conventional Leyner-type shank. A sleeve 14 coaxial with the working cylinder 2 is rotatable in the chuck housing 8 and provided with straight internal ribs 15 cooperating with the straight grooves 11 of the piston shank 5. The sleeve 14 is in non-rotational engagement with the bushing 12 by means of a castled end portion on the sleeve at 16 engaging a similarly castled end portion of the bushing 12 as illustrated in FIG. 4 which shows the cooperating ends of the sleeve 14 and bushing 12. A further sleeve or ratchet ring 17 is rotatably mounted in the chuck housing 8 and is provided with ribs 18 engaging the inclined grooves 10 of the piston shank. The ratchet ring 17 is provided with ratchet teeth 19 cooperating with pawls 20 mounted to swing in the chuck housing 8 about axes parallel with the cylinder axis. Tubular rubber-like members 21 having air cores 24 of an elastic synthetic resin, for instance a material sold under the trademark Hydrofit, are provided in corresponding recesses 22 in the chuck housing 8 with their axes parallel to the cylinder axis and force the pawls 20 into engagement with the teeth 19 of the ratchet ring 17. FIG. 5 shows one of the members 21 in cross section when they are not compressed as in FIG. 2. FIG. 6 shows a modified member in cross section, said member being carried out as a hollow ball 25 having a cavity 26 communicating with the outside of the ball through openings 27. The grooves 10 in the piston shank are of such length that compressed air is admitted through said grooves from the underside of the piston before the piston on the return stroke uncovers exhaust ports 23 in the cylinder. Cool compressed air is therefore supplied to the pawl and ratchet mechanism which is effectively lubricated and cooled by said partially expanded compressed air. By this means the temperature of the tubular elastic members 21 is kept down at a safe value. Furthermore, during operation the members 21 are alternately compressed and allowed to expand so that air is pumped into and from the cavity in the members 21.

The embodiment of the invention above described should be considered only as an example and the invention may be modified in several different ways within the scope of the claims. The elastic members may, for instance, also be shaped as half-shperical or half-cylindrical bodies having a cavity communicating with the surroundings of the member to permit them to breathe during operation or in any other suitable way. Elastic members 21 for actuating pawls of a pawl and ratchet mechanism may be provided also in such rock drills in which the pawl and ratchet mechanism for rotating the drill steel is provided in the back head of the drill and operates to turn the hammer piston through a conventional riffle bar and a cooperating nut in the head of the piston, as is well known to those skilled in the art.

What I claim is:

1. In a percussion tool, a cylinder casing having a handle at the rear end, a working cylinder formed in said casing having a longitudinal axis, a hammer piston having a piston head reciprocable in said working cylinder and a shank, a pawl and ratchet mechanism in the casing cooperating with said piston, a chuck bushing in the casing having a non-circular opening for receiving the shank of a drill steel and cooperating with said piston and said pawl and ratchet mechanism to receive rotational movement upon reciprocation of said piston, a ratchet member mounted in said cylinder casing to rotate on said longitudinal axis and having a number of indents at the outside periphery, one or more pawls mounted in the cylinder casing outside said ratchet member to swing on axes parallel to said longitudinal axis in and out of engagement with said indents, one or more inwardly opening recesses in said casing, and tubular biasing members of a rubber-like elastic material disposed in said recesses with their axes parallel to said longitudinal axes and so as to urge said pawls into engagement with said indents.

2. In a pneumatic percussion tool, a cylinder casing having a handle, a working cylinder formed in said casing having a longitudinal axis, a hammer piston having a piston head reciprocable in said working cylinder and a shank provided with straight and inclined longitudinal grooves and adapted to deliver blows, a chuck housing at the forward end of the cylinder casing, a chuck bushing rotatably mounted in said chuck housing and having a non-circular opening for receiving the shank end of a drill steel, a sleeve rotatably mounted in the chuck housing in non-rotational engagement with said chuck bushing and provided with internal ribs engaging said straight and inclined longitudinal grooves of the piston shank, a pawl and ratchet mechanism including a rotatable member provided with internal inclined ribs engaging said inclined longitudinal grooves of the piston shank, a stationary member, a plurality of outwardly opening indents in one of said members, one or more pawls mounted in the other of said members for movement in and out of engagement with said indents, one or more inwardly opening rounded recesses in said other member, and hollow biasing members of a rubber-like elastic material disposed in said recesses so as to urge said pawls into engagement with said indents and so that compressed air has access to the cavity of said hollow members.

3. In a pneumatic percussion tool a cylinder casing having a handle, a working cylinder in said casing having a longitudinal cylinder axis, a hammer piston having a piston head reciprocable in said working cylinder under the action of compressed air and a shank adapted to deliver blows, straight longitudinal grooves in said piston shank, inclined longitudinal grooves in the piston shank, a chuck housing at the front end of said cylinder casing, a ratchet ring rotatably mounted in said chuck housing and provided with internal ribs cooperating with said inclined grooves and with external indents, a number of pawls mounted in said chuck housing for swinging in and out of engagement with said indents, tubular elastic members disposed with their axes parallel to the cylinder axis and arranged to bias said pawls into engagement with said indents, a chuck bushing in the chuck housing having a non-circular opening for receiving a shank end of a drill steel, a rotatable sleeve in the chuck housing in a non-rotational engagement with said chuck bushing and having axially extending internal ribs engaging said straight grooves in the piston shank, said inclined grooves having such length that they are uncovered within the working cylinder on the return stroke of the piston before the piston opens the exhaust ports on the return stroke.

References Cited in the file of this patent

UNITED STATES PATENTS

| | | |
|---|---|---|
| 84,654 | Sames | Dec. 1, 1868 |
| 645,682 | Fitz-Simmons | Mar. 20, 1900 |
| 1,034,010 | Gilman | July 30, 1912 |
| 1,937,511 | Crane | Dec. 5, 1933 |
| 2,688,268 | Lear | Sept. 7, 1954 |

FOREIGN PATENTS

| | | |
|---|---|---|
| 353,174 | Italy | Oct. 6, 1937 |
| 1,091,242 | France | Jan. 8, 1954 |